(12) United States Patent
Breed

(10) Patent No.: US 8,801,033 B2
(45) Date of Patent: Aug. 12, 2014

(54) AIRBAG SYSTEM

(75) Inventor: David S Breed, Miami Beach, FL (US)

(73) Assignee: Automotive Technologies International, Inc., Boonton, NJ (US)

( * ) Notice: Subject to any disclaimer, the term of this patent is extended or adjusted under 35 U.S.C. 154(b) by 0 days.

(21) Appl. No.: 13/699,390

(22) PCT Filed: Jun. 2, 2011

(86) PCT No.: PCT/US2011/038911
§ 371 (c)(1),
(2), (4) Date: Nov. 21, 2012

(87) PCT Pub. No.: WO2011/153338
PCT Pub. Date: Dec. 8, 2011

(65) Prior Publication Data
US 2013/0062866 A1 Mar. 14, 2013

Related U.S. Application Data

(60) Provisional application No. 61/350,756, filed on Jun. 2, 2010.

(51) Int. Cl.
*B60R 21/203* (2006.01)
*B60R 21/30* (2006.01)

(52) U.S. Cl.
USPC ............. 280/731; 280/735; 280/738; 701/45

(58) Field of Classification Search
USPC .............. 280/728.3, 731, 732, 735, 736, 738, 280/741, 742, 743.1; 180/274; 701/45
See application file for complete search history.

(56) References Cited

U.S. PATENT DOCUMENTS

| | | | |
|---|---|---|---|
| 4,711,125 A | | 12/1987 | Morrison |
| 5,398,963 A | * | 3/1995 | Fohl ............................. 280/731 |
| 5,403,034 A | * | 4/1995 | Gans et al. ................. 280/728.3 |
| 5,437,473 A | * | 8/1995 | Henseler ....................... 280/738 |
| 5,441,301 A | | 8/1995 | Breed et al. |

(Continued)

FOREIGN PATENT DOCUMENTS

| | | |
|---|---|---|
| GB | 1184122 A | 3/1970 |
| WO | 9610497 A1 | 4/1996 |

(Continued)

OTHER PUBLICATIONS

Supplementary European Search Report for European Patent Application No. 11 83 7015 dated May 9, 2014.

*Primary Examiner* — Paul N Dickson
*Assistant Examiner* — George Spisich
(74) *Attorney, Agent, or Firm* — Brian Roffe

(57) ABSTRACT

Low cost airbag system (1) for a vehicle that deploys to protect a driver and optionally a passenger during a crash involving the vehicle. The airbag system includes a crash sensor system (2) that detects a crash involving the vehicle, a driver side airbag module (40) mounted to a steering wheel and including a driver side airbag (42) that inflates to protect the driver and a gas generator (108) that generates inflation medium to inflate the driver side airbag (42). A control module (6) is coupled to the crash sensor system (2) and gas generator (108) and initiates generation of inflation medium by the gas generator (108) based on detection of a crash by the crash sensor system (2). A similar system is provided for the passenger side airbag module (20).

23 Claims, 12 Drawing Sheets

(56) References Cited

U.S. PATENT DOCUMENTS

| | | | |
|---|---|---|---|
| 5,653,464 A | 8/1997 | Breed et al. | |
| 5,797,623 A * | 8/1998 | Hubbard | 280/735 |
| 5,803,494 A * | 9/1998 | Headley | 280/741 |
| 5,829,780 A * | 11/1998 | Tesauro et al. | 280/731 |
| 5,863,068 A * | 1/1999 | Breed | 280/743.1 |
| 5,954,359 A * | 9/1999 | Ross | 280/731 |
| 5,990,569 A | 11/1999 | Lundberg | |
| 6,097,284 A * | 8/2000 | Nitschke et al. | 340/436 |
| 6,129,374 A * | 10/2000 | Yamada et al. | 280/728.2 |
| 6,206,129 B1 | 3/2001 | Breed et al. | |
| 6,328,126 B2 | 12/2001 | Breed et al. | |
| 6,517,105 B1 | 2/2003 | Ford | |
| 6,553,914 B2 | 4/2003 | Hosey et al. | |
| 6,661,115 B2 * | 12/2003 | Lester | 307/10.1 |
| 7,098,778 B1 * | 8/2006 | Zoratti et al. | 340/436 |
| 7,139,651 B2 * | 11/2006 | Knowlton et al. | 701/50 |
| 7,243,945 B2 | 7/2007 | Breed et al. | |
| 7,352,080 B2 * | 4/2008 | Grasshoff | 307/10.1 |
| 7,421,321 B2 | 9/2008 | Breed et al. | |
| 7,481,453 B2 | 1/2009 | Breed | |
| 7,556,118 B2 | 7/2009 | Huh et al. | |
| 7,570,068 B2 * | 8/2009 | Bauer et al. | 324/713 |
| 7,744,122 B2 * | 6/2010 | Breed | 280/731 |
| 7,766,383 B2 | 8/2010 | Breed et al. | |
| 7,820,566 B2 | 10/2010 | Breed et al. | |
| 2002/0190505 A1 * | 12/2002 | Feistel et al. | 280/728.3 |
| 2004/0199318 A1 * | 10/2004 | Shieh et al. | 701/45 |
| 2006/0192373 A1 | 8/2006 | Manley | |
| 2006/0232052 A1 * | 10/2006 | Breed | 280/735 |
| 2007/0192007 A1 * | 8/2007 | Stanley et al. | 701/45 |
| 2007/0235996 A1 | 10/2007 | Huh et al. | |
| 2009/0150029 A1 * | 6/2009 | Pavelescu et al. | 701/45 |
| 2009/0224515 A1 | 9/2009 | Breed et al. | |
| 2009/0256339 A1 * | 10/2009 | Mampe | 280/735 |
| 2012/0205901 A1 | 8/2012 | Westoby | |

FOREIGN PATENT DOCUMENTS

| | | |
|---|---|---|
| WO | 9613406 A1 | 5/1996 |
| WO | 0121450 A1 | 3/2001 |
| WO | 2006086247 A2 | 8/2006 |
| WO | 2010015809 A1 | 2/2010 |

\* cited by examiner

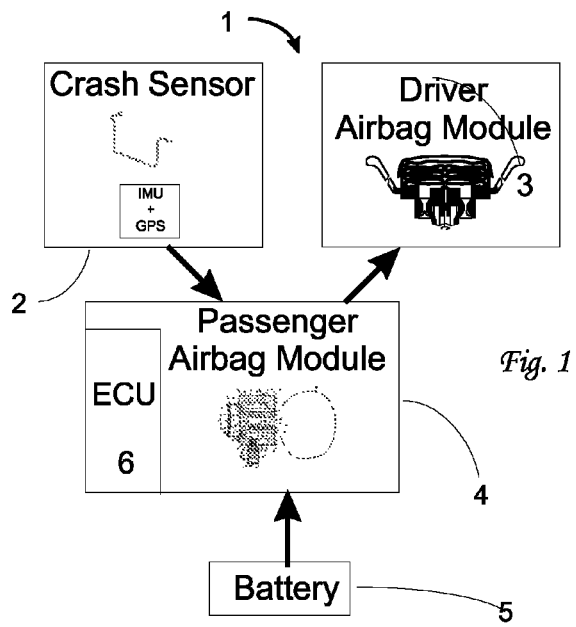
Fig. 1
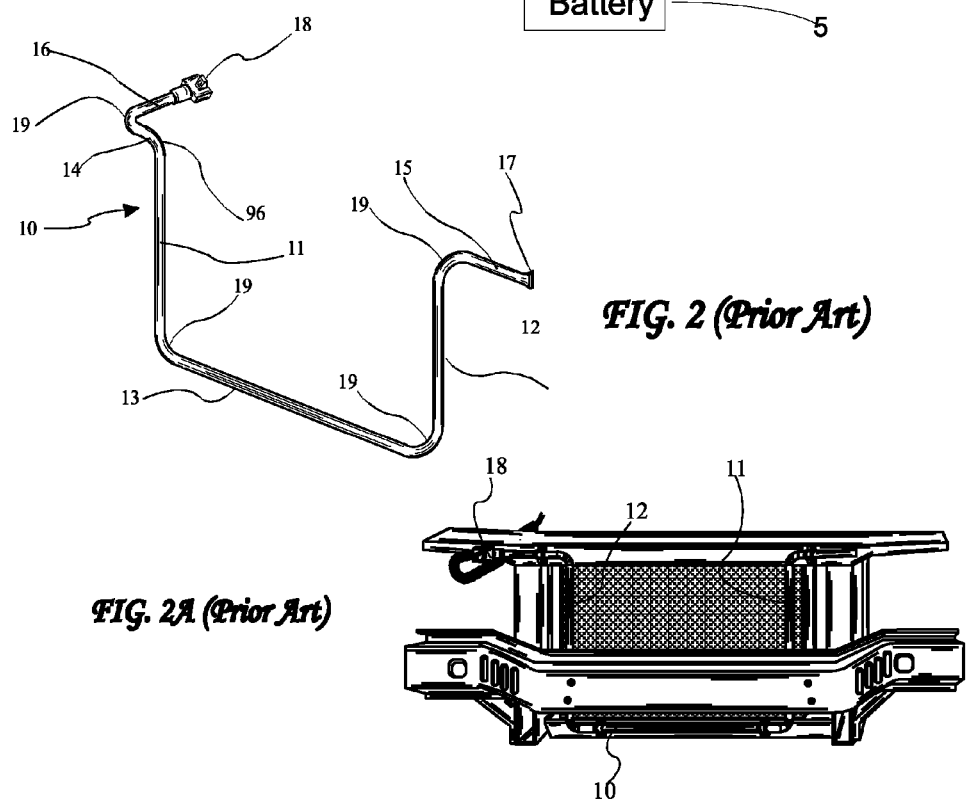
FIG. 2 (Prior Art)
FIG. 2A (Prior Art)

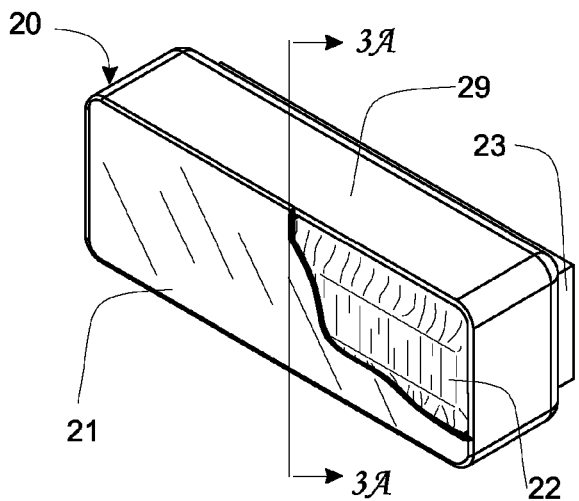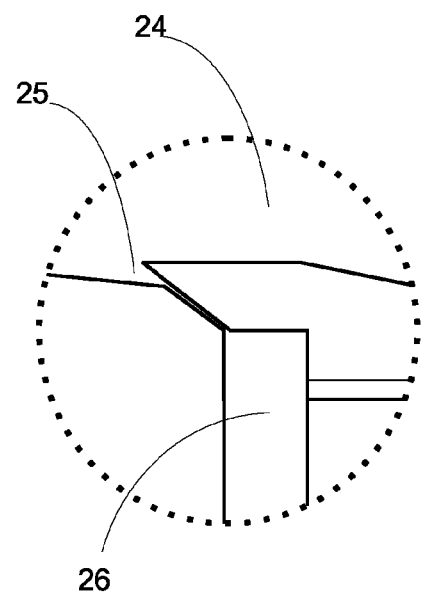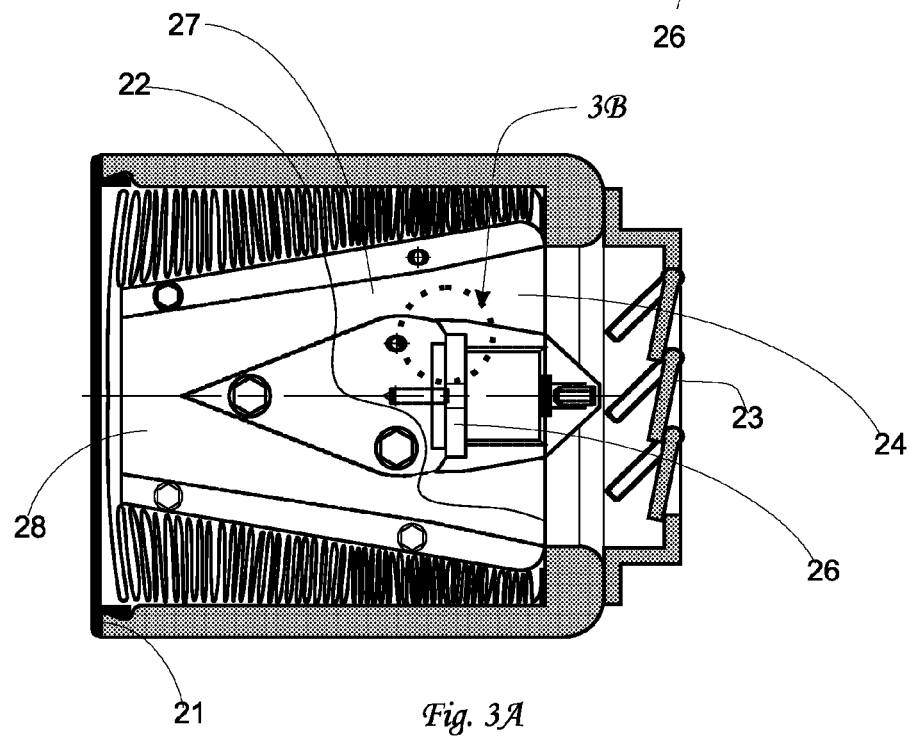

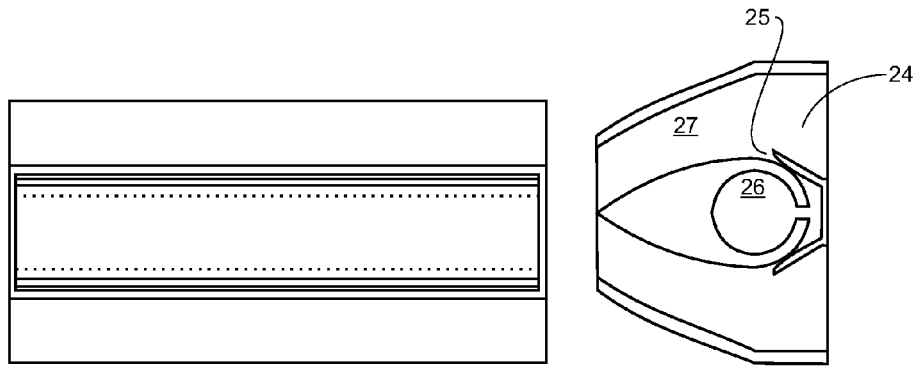
*Fig. 3C*                    *Fig. 3D*
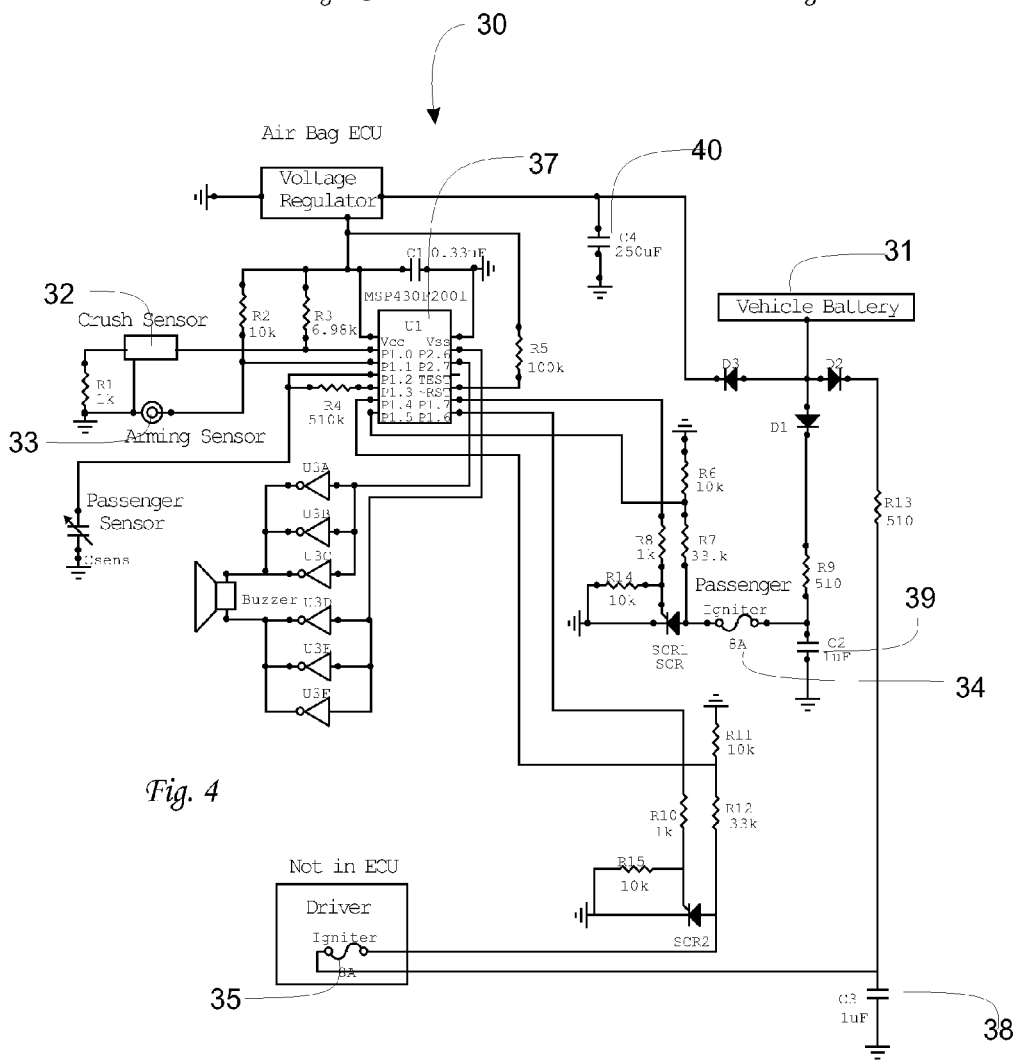
*Fig. 4*

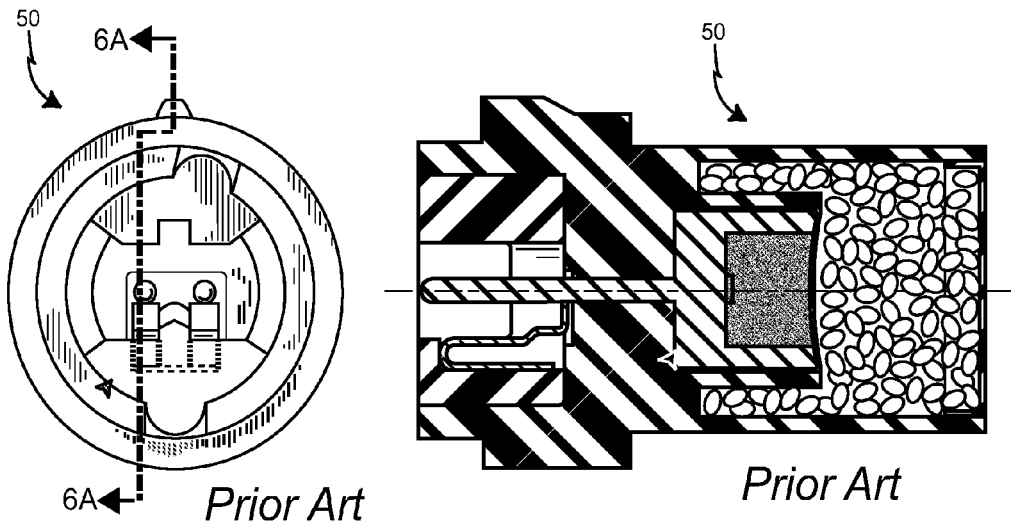
Fig. 6 *Prior Art*
Fig. 6A *Prior Art*
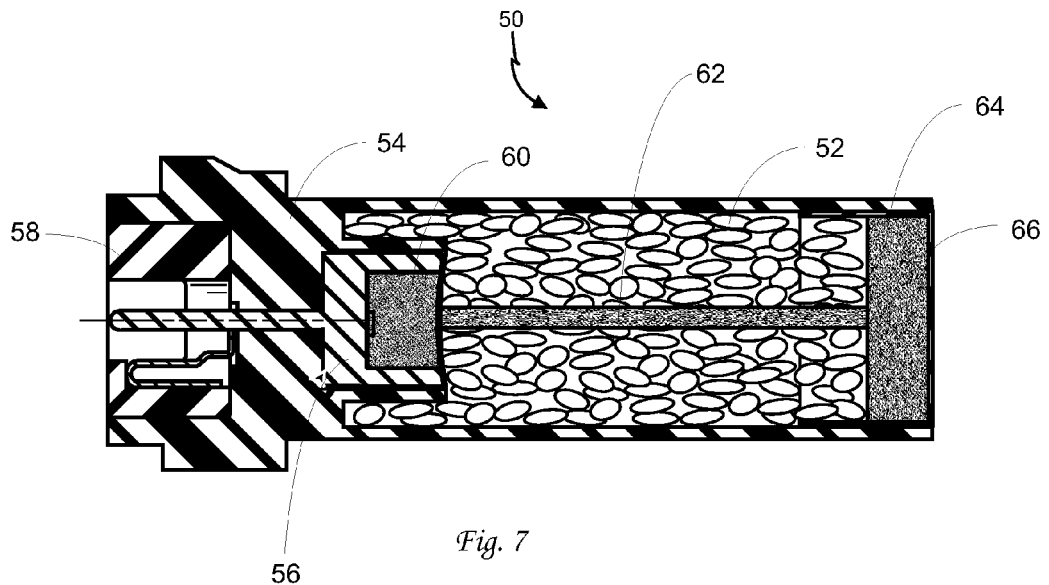
Fig. 7

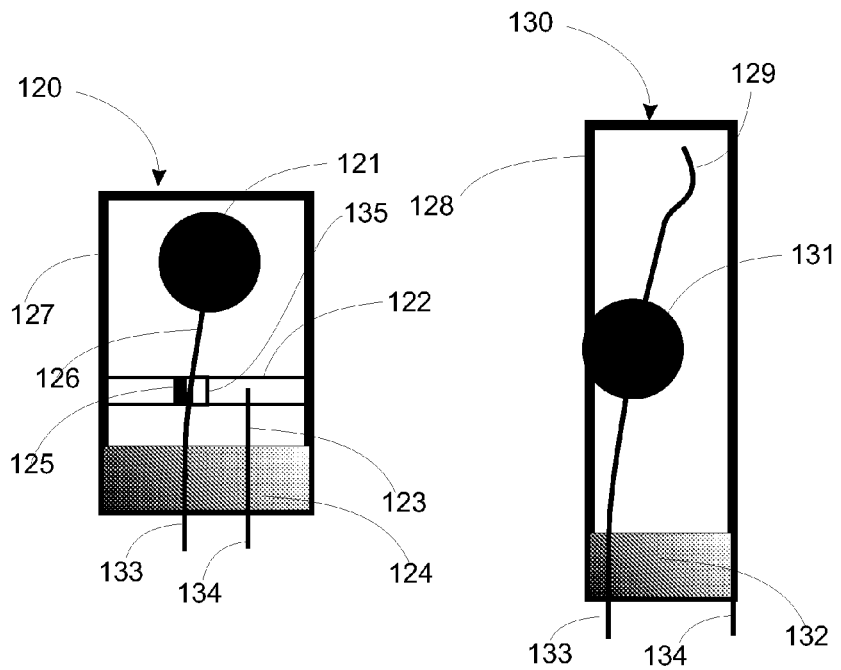
Fig. 12A
Fig. 12B
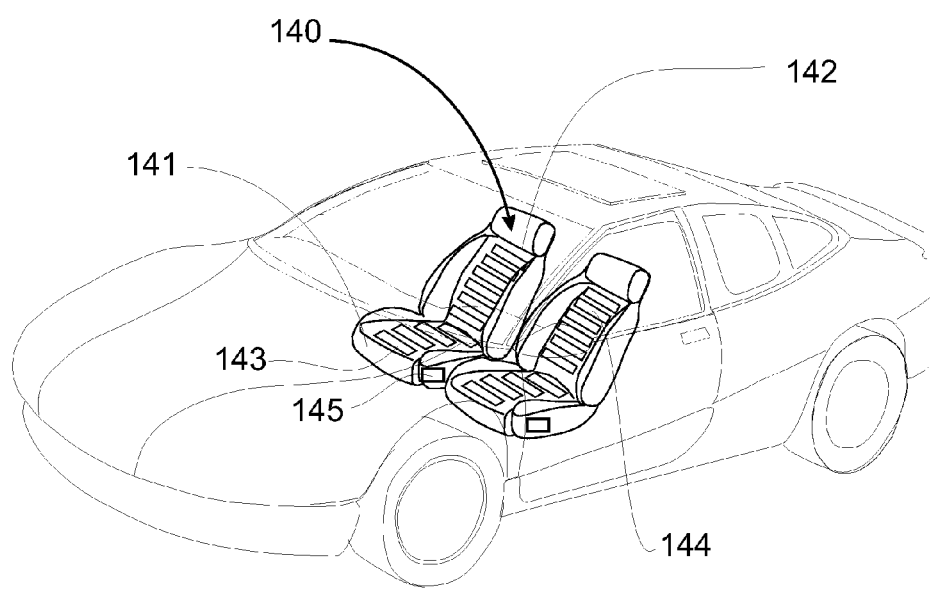
Fig. 13

AIRBAG SYSTEM

TECHNICAL FIELD

The present invention primarily relates to low cost airbag systems which are typically targeted for use in developing countries but may also find application on low cost vehicles in developed countries.

BACKGROUND ART

Much of the world's people are now moving out of poverty where they have limited discretionary funds but have aspirations of leading a better life. This has given rise to a potentially explosive market for very low cost motor vehicles, such as the Tata Nano. This explosive growth will also result in an explosive growth in the number of people killed while driving such vehicles and hence there is a need for low cost passive safety systems, such as seatbelts and airbags. The Tata Nano sells in India for between $2000 and $2500 and company management has stated that their goal is for a $10 airbag system or $20 for the driver and passenger systems per vehicle. The inventions disclosed herein are directed toward such a very low cost airbag system.

DISCLOSURE OF THE INVENTION

A preferred implementation of the invention comprises:
1. A single point crash sensor comprising one or more MEMS accelerometers mounted in the passenger airbag ECU. In one preferred embodiment, a single MEMS accelerometer in used in conjunction with a low cost GPS chip which is used to correct errors in the MEMS accelerometer. In another preferred embodiment, up to three accelerometers and three gyroscopes are used making up an inertial measurement unit (IMU) which can be coupled to a low cost GPS chip or receiver system to improve the accuracy of the devices making up the IMU through a Kalman filter. Such an IMU can also be used for electronic stability control, rollover sensing, navigation and other applications where an accurate measurement any or all of the acceleration, velocity, angular velocity, displacement and angular displacement would be useful.
2. An alternate crash sensor system can use a Crush-Switch® crash sensor mounted in the front of the vehicle sufficiently rearward of the bumper such that bending and triggering of the sensor are indicative of the crush associated with a crash having a velocity change of typically 8 MPH or more.
3. A driver side airbag module where an airbag is mounted on the steering wheel and rotates therewith and a gas generator can be fixed to the steering column where it does not rotate with the steering wheel. The gas generator can be an aspiration system or aspirated inflator with a pumping ratio exceeding about 2.0 to as high as about 10 or more. Part of the aspiration nozzle thereof is fixed with the gas generator and the mating part is fixed with the steering wheel and rotates therewith. A preferred gas generating material can be selected from the group of single, double or triple base smokeless gun propellants, although many other propellants, such as guanidine nitrate or conventional airbag propellants such as sodium azide, can be used. An alternate gas generator uses compressed gas.
4. An optional passenger side airbag module mounted in the instrument panel and also contains an aspiration system with a pumping ratio between 2.0 and 10 or greater and can use a smokeless gun propellant or other propellant or compressed gas as in the driver side airbag module.
5. A simple electronic control module housed within the passenger airbag module and connected to the Crush-Switch or electronic crash sensor and to the driver airbag module through appropriate wires. When the Crush-Switch closes indicating a crash requiring an airbag deployment, the electronic package closes a switch which initiates deployment of both the passenger and driver airbag systems. Alternatively, it can send a coded digital signal to the driver airbag system to simultaneously initiate deployment of the driver airbag.
6. When the digital signal implementation is used, the driver airbag system may contain an electronic module which decodes the signal from the passenger module and closes a switch deploying the driver airbag.
7. Both the passenger and driver airbag modules may contain capacitor energy storage devices when the digital signal for the driver system is used which provide sufficient energy to initiate deployment of their respective airbags. Alternatively, when a direct fire system is used, a single capacitor, preferably located in the passenger module, can provide sufficient energy to fire both driver and passenger systems. However, for reliability reasons, two capacitors can be used even when both are in the passenger module to prevent the case where an excessive current is drawn therefrom by one airbag module thereby robbing the required current from the other module.
8. A wire connects the vehicle battery to the passenger airbag module which maintains the energy storage capacitor, if used, in a charged state in the passenger module and through the wire connecting the passenger module with the driver module, it can also maintain the driver capacitor in a charged state when one is present. Alternately, the wire can provide power to the airbag modules directly without the use of energy storage capacitors or in parallel with them.
9. The driver and passenger airbags are comprised of woven plastic film the various parts of which are heat-sealed, adhesive-sealed or vulcanized together. Alternately, the airbags can be made from a reinforced plastic film where the reinforcement is made from a suitable high strength material. One or both airbags can be without vents with the venting function provided by flow through the aspirated inflator.

Numerous additions and modification to the above-described preferred system are possible and many will be described below, and others will become obvious to those skilled in the art after reading this specification.

BRIEF DESCRIPTION OF DRAWINGS

The following drawings are illustrative of embodiments of the invention and are not meant to limit the scope of the invention as encompassed by the claims.

FIG. 1 is a schematic diagram of a preferred embodiment of an airbag system of the invention.

FIG. 2 is an illustration of a prior art version of a crush sensing crash sensor for sensing frontal crashes and FIG. 2A illustrates the mounting of such a sensor to the radiator structure of a vehicle.

FIG. 3 is a perspective view of the passenger airbag module of this invention, FIG. 3A is a cross section view taken at 3A-3A in FIG. 3 and FIG. 3B is an expanded view of a high-pressure injection duct taken in circle 3B of FIG. 3A.

FIGS. 3C and 3D are details of aspirator designs of a preferred implementation of the passenger inflator system of FIG. 3 which results in an aspiration ratio of about 3.5.

FIG. 4 is a system circuit schematic for an airbag system controller that can be a part of the invention.

FIG. 6 is a view of a prior art seatbelt retractor gas generator detail and FIG. 6A is a cross section view taken along line 6A-6A in FIG. 6.

FIG. 7 is a view of one embodiment of a gas generator cartridge for use with the aspirated inflators of this invention.

FIGS. 12A and 12B illustrate an electromechanical arming sensor that can be used with the system.

FIG. 13 is an illustration of a capacitance or electric field based occupant presence, mass and health monitoring sensor which can be used with the system.

BEST MODES FOR CARRYING OUT INVENTION

Figure 5:
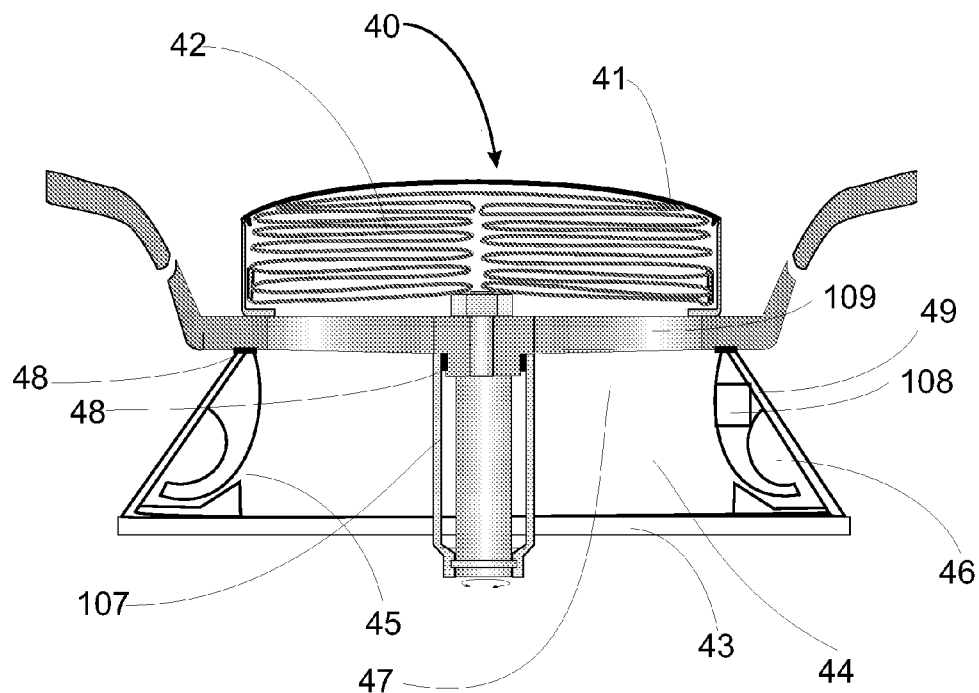
FIG. 5 is a view of a driver airbag module with an aspirated inflator.

Referring to the drawings wherein like reference numbers refer to the same or similar elements, a schematic diagram of a preferred embodiment of an airbag system 1 of the invention is illustrated in FIG. 1. The crash sensor 2 for this preferred implementation, which can be used as the primary crash sensor or in conjunction with a single point crash sensor, is a rod-in-tube crush sensing device, such as described in U.S. Pat. No. 7,481,453. This crash sensor 2 can be placed a calibrated distance rearward of the front of the vehicle such that a crushing of the vehicle to that location resulting in a bending of the tube is indicative of a crash requiring deployment of the passive restraint system. The airbag system, or more generally the passive restraint system, can include one or more airbags, seatbelt pretensioners, seatbelt airbags, nets or any other deployable passive restraint. In an alternative preferred implementation, a single point crash sensor can be used with or without a crush zone mounted crash sensor.

In FIG. 1, the airbag system is shown generally at 1, the crush sensors as crash sensors at 2, a driver airbag module at 3, a passenger airbag module at 4 and a battery at 5. The electronics control unit (ECU) 6 can be housed within the passenger airbag module 4, separate from it or at any other convenient location. A single point crash sensor and an arming or safing sensor can be located within the ECU 6 or separate from it.

A crush sensing sensor is shown generally at 10 in FIG. 2. In the implementation shown in U.S. Pat. No. 7,481,453, a sensor 10 comprises a unitary, tubular member having two vertical portions 11 and 12, a lower horizontal portion 13, two upper horizontal portions 14 and 15 and a rearward projecting portion 16. The sensor 10 is closed at an end 17 of horizontal portion 15, e.g., by welding, and a header/connector 18 is attached to the sensor 10 at the end of portion 16.

Sensor 10 can be mounted to the front of the vehicle and can be constructed of a tube and a centrally located rod which is substantially coextensive with the tube but normally not in contact therewith. The sensor 10 functions (for example to initiate deployment of an airbag) when it is bent at any position along the tube with the exception of pre-bent sections, such as bends 19, which join the vertical portions 11, 12 to the upper horizontal portions 14 respectively, and where plastic spacers, not shown, prevent the rod from contacting the tube as described in the '453 patent.

When the sensor 10 is bent during an accident, the rod, which is electrically conducting, approaches and potentially contacts the tube, which is also electrically conducting. When the rod contacts the tube, this indicates that an accident of sufficient severity as to require airbag deployment has occurred. There are other methods of using the rod-in-tube construction to sense accidents as disclosed in the '453 patent. An example of how the sensor 10 can be mounted to the radiator structure of a vehicle is shown in FIG. 2A for vehicles that have a front radiator structure.

A front passenger side airbag module according to the invention is illustrated generally at 20 in FIG. 3. Airbag module 20 comprises a housing 29, cover 21, airbag 22 and aspiration valve assembly 23. FIG. 3A illustrates a cross section view taken at 3A-3A in FIG. 3 and shows the relationship of the parts in more detail. Gas is fed into an aspiration section including the aspiration valve assembly 23 from a gas generator or compressed gas storage container, not shown, into channel 26 as shown in FIG. 3B. High pressure gas from channel 26 flows through restrictor 25 into a converging nozzle 24 where it mixes with and draws in gas from the passenger compartment through the aspiration valve assembly 23. Somewhat downstream from the converging nozzle 24, the mixed gas enters a diverging nozzle 27 and then into a section 28 where it flows into and inflates the airbag 22. FIGS. 3C and 3D illustrate the geometry of a preferred passenger inflator which yielded a pumping ratio of about 3.5. The pumping ratio is the ratio of the aspirated gas volume to the generated gas volume, in this case meaning that about 78% of the gas was from the passenger compartment and 22% from the gas generator.

In one implementation, when combustion of the propellant is initiated, as discussed below, a small amount of high pressure gas, such as created when substantially pure $BKNO_3$ is burned, enters the channel 26 and then flows into restrictor 25 and into the converging and diverging nozzles 24 and 27 respectively. This very high pressure and high temperature gas has very low density and thus flows rapidly into where it exerts a high pressure on the front of the airbag and the module cover causing the cover to be released and the airbag to begin initial deployment. This process lasts for a very short time, from about one to a few milliseconds, and occurs prior to the opening of the aspiration valve assembly 23. This initiation process causes the cover to be released and the airbag to begin to deploy. After a very short time period, the gas cools sufficiently to condense and create a vacuum in the airbag as well as in the various sections and nozzles 28, 27 and 24. This can then cause the aspiration valve assembly 23 to open and help start the aspiration process. By this time, the gas from the burning main propellant has begun to flow through channel 26 and restrictor 25 into converging nozzle 24. The gas from the main propellant then mixes with the gas from the atmosphere and the mixed gas inflates the airbag. By this process, aspiration rates exceeding 3 parts air from the passenger compartment to one part gas from the propellant can be achieved. Like numbers represent like parts in FIGS. 3-3D.

A circuit schematic for one example of a simple low cost airbag system circuit for the driver and passenger airbag systems is illustrated in FIG. 4. The system circuit can reside in a housing which can additionally contain other circuits relative to the passive safety system. It can also house other circuits which may or may not be related, such as circuits related to an occupant sensor system or to an active safety system if present. Other passive safety systems which are not shown can include side airbags, side curtain airbags, knee bolster airbags, seatbelt-mounted airbags, active headrests, and seatbelt pretensioners among others. These circuits, taken individually or in combination, may generally be referred to herein as the airbag system controller or safety system controller, or control circuit, control unit, control system, control arrangement, control module.

Referring to FIG. 4, a control circuit that controls the firing of the driver and passenger airbag systems is shown generally at 30. A vehicle battery 31 supplies power to the system. A crush sensor 32 is mounted in a frontal crush zone of the vehicle and detects whether the vehicle has crushed sufficiently in an accident to warrant triggering of one or more of the airbags and is a switch closure input to the circuit 30. In a similar manner, an arming sensor 33 also provides a switch closure to the circuit 30. Both sensor switches are required to close to deploy the airbags or other passive restraint devices. In contrast to earlier systems, the closures do not need to overlap as long as both sensors 32, 33 close during an accident relevant time period, such as about 100 milliseconds. This permits a simple arming sensor to be used which may only provide a closure of less than 1 millisecond which may occur before the crush sensor 32 closes or after it has become disconnected from the circuit 30 due to crash damage. If a processor 37 has determined that both sensors 32 and 33 have closed, current is sent to both a passenger airbag inflator igniter 34 (or gas generator) and a driver airbag inflator igniter 35 (or gas generator) and both airbags deploy.

Processor 37 also can perform minimal diagnostics on key on, for example, to check for an open or shorted crush sensor 32, an open passenger airbag inflator igniter 34, an open driver airbag inflator igniter 35, a shorted arming sensor 33, the voltage on backup capacitor power supplies 38, 39, 40 for the driver airbag, passenger airbag and processor 37 and the status of the seat occupancy sensor or switch if present. If an unexpected condition is found, a buzzer, or alternately a warning light, can be activated using any convenient code to indicate to the operator the nature of the fault. Also, a record of the fault can be stored in memory associated with the processor 37 or at some other convenient location. Although not shown in FIG. 4, an electronic crash sensor system can be used along with or in place of the crush sensor 32. Such an electronic crash sensor system will be described below and can consist of one or more forward crush zone mounted accelerometers, a MEMS single or dual axis accelerometer or an IMU mounted within the ECU or at some other convenient mounting location. A GPS receiver can be used along with the electronic crash sensor system to correct for the errors in the accelerometers and gyroscopes. Such a correction system can make use of a Kalman filter as is known in the navigation art but is believed to be novel to the crash sensor art. Previously, MEMS accelerometers needed to be continuously self-tested in order to correct for errors due to temperature and time related drifts within the accelerometers. Thus, the GPS-Kalman filter approach described here significantly simplifies the hardware, circuits and software needed for MEMS-based crash sensors.

An aspiration arrangement similar to the one discussed above with reference to FIG. 3 is illustrated generally at 40 in FIG. 5 for the driver side airbag module. Aspiration arrangement 40 is arranged on the opposite side of the steering wheel, i.e., the central part thereof, from an airbag 42 and an airbag cover 41 that covers the airbag 42. Aspiration arrangement 40 comprises a housing 49 and aspiration valve assembly 43. The valve assembly 43 is not illustrated in detail in FIG. 5 but can consist of a flexible material positioned against a screen. When a pressure differential occurs across the flexible material due to a drop in pressure within the housing 49, the flexible material deforms and rests against a housing retainer 107 to permit air to flow from the passenger compartment into the airbag 42 through an interior of the housing 49 wherein it is mixed with gas or other inflating medium generated by a gas generator of a combustion module 108. Gas is fed into the aspiration section including the aspiration valve assembly 43 from the gas generator or combustion module 108 into channel 46. High-pressure gas from channel 46 flows through restrictor 45 into a converging nozzle 44 where it mixes with and draws in gas from the passenger compartment through the aspiration valve assembly 43. Somewhat after the converging nozzle 44, the mixed gas enters a diverging nozzle 47 and then passes into and inflates the airbag 42 (through one or more apertures 109 formed in the central part of the steering wheel). Housing 49 is provided with suitably shaped walls to create the converging and diverging nozzles 44, 47. Bearing pads and seals 48 can be made of an appropriate material such as felt to allow rotation of the steering wheel relative to the inflator (that portion of the airbag module rearward of the steering wheel) while minimizing the leakage of gas from the inflator to the atmosphere.

Figures 5A, 5B:
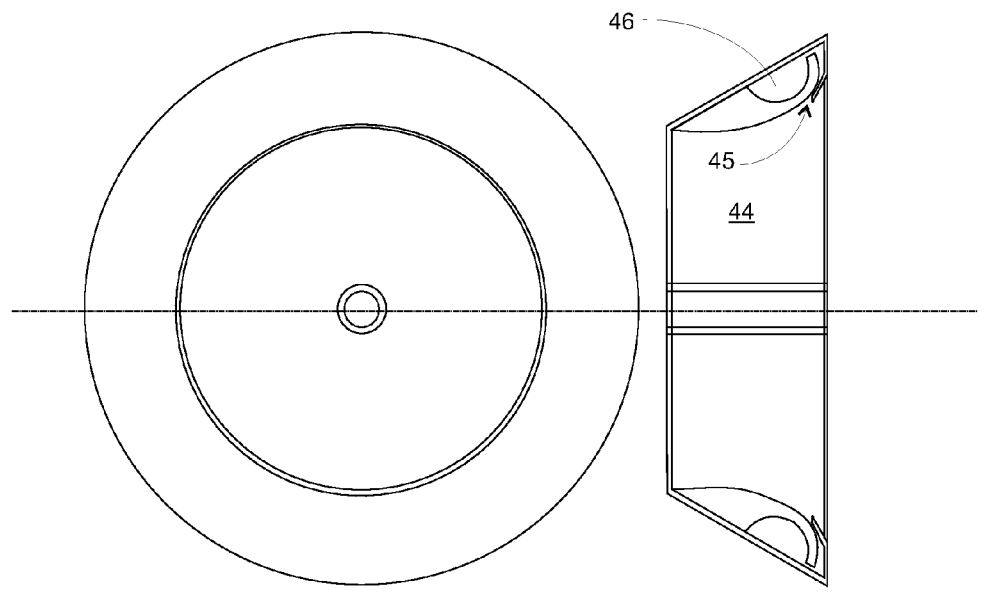
FIGS. 5A and 5B are details of the aspirator designs of a preferred implementation of the driver inflator system of FIG. 5 which results in an aspiration ratio of about 3.5.

FIGS. 5A and 5B illustrate the geometry of a preferred driver inflator which yields a pumping ratio of about 3.5. Substantially all of the parts which make up the aspirated inflator are made from reinforced plastic. The aspiration system maintains the assembly cool during operation. Slight erosion of the plastic can occur in the areas of the restrictor and some metal shielding may be necessary. This shielding can be insert-molded into the plastic during the molding operation.

In one preferred implementation, when combustion of the propellant is initiated, as discussed below, a small amount of high pressure and high temperature gas, such as created when substantially pure $BKNO_3$ is burned, enters the channel 46 and then passes into restrictor 45 and into the converging and diverging nozzles 44 and 47 respectively. This very high pressure and temperature gas has very low density and thus flows rapidly into where it places a high pressure on the front of the airbag and the airbag cover 41 causing the cover 41 to be released and the airbag 42 to begin initial deployment. This process lasts for a very short time, from less than one to a few milliseconds, and occurs prior to the opening of the aspiration valve assembly 43. This initiation process causes the cover 41 to be released and the airbag 42 to begin to deploy. After a very short time period, the gas cools sufficiently to condense and create a vacuum in the airbag 42 as well as in the various nozzles 47 and 44. This then causes the aspiration valve assembly 43 to open and helps to start the aspiration process. By this time, the gas from the burning main propellant has begun to flow through channel 46 and restrictor 45 into converging nozzle 44. The gas from the main propellant then mixes with the gas from the passenger compartment and the mixed gas inflates the airbag 42. By this process, aspiration rates exceeding 3 parts air from the passenger compartment to one part gas from the propellant can be achieved. Alternatively, the $BKNO_3$ can be eliminated at the expense of additional propellant and a lower overall pumping ratio achieved.

A prior art gas generator 50 is illustrated in FIGS. 6 and 6A. This generator is described in U.S. Pat. No. 6,553,914. This and similar generators have previously been used with nitrocellulose and other single, double and triple base propellants only for seatbelt pretensioners due to the significant amounts of carbon dioxide generated which, if used for the driver and passenger airbags, could be toxic for humans if breathed for an extensive time period. In the inventions described herein, however, this type of generator can be used since most of the gas used to inflate the airbags is air which comes through aspiration from the passenger compartment and thus relatively little carbon dioxide is released into the passenger compartment from the airbags.

A modification of the prior art gas generator illustrated in FIGS. 6 and 6A for use with an aspirated driver and passenger airbag is illustrated in FIG. 7. The quantity of gas generating material 52 and thus the geometry, overall size and particularly the length of a gas generator cartridge 50 will vary from vehicle to vehicle, depending of the sizes of the airbags used, and whether it is for the driver or passenger airbag. The gas generator cartridge 50 contains a hermetically sealed igniter 56, containing igniter propellant 60, which is molded into a cartridge housing 54 as discussed in the '914 patent. A coupler 58 connects the cartridge housing 54 to an initiation circuit, not shown. When the igniter 56 is initiated, it begins igniting the propellant 52 and a column of a fast burning igniter propellant 62 which rapidly carries the combustion to a disk of igniter propellant 64, such as BKNO3, to the front of the cartridge where it creates the gas that can be the first gas that enters the aspirator, after passing through a perforated side panel 66 of the cartridge housing 54. This gas burns very fast and very hot but due to its small quantity, typically 1-3 grams, it has little total thermal energy and causes only superficial damage to the parts of the aspirator and later the airbag. When this gas enters the airbag, it creates a high pressure for a very short time but sufficient to pop off the airbag cover and begin deployment of the airbag. Immediately after it enters the airbag, it cools and condenses and creates a partial vacuum which aids in the opening of the aspiration valve and initiating the aspiration.

Figure 8:
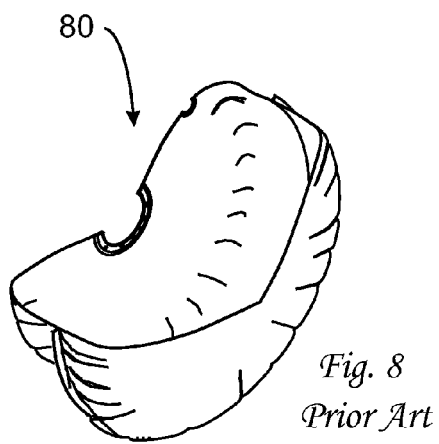
FIG. 8 is an illustration of a prior art driver airbag made from woven film and FIGS. 8A-8E are prior art illustrations of the woven film material forming the airbag of FIG. 8.
Figure 8A:
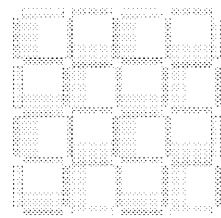
Figure 8B:
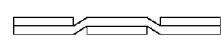
Figure 8C:
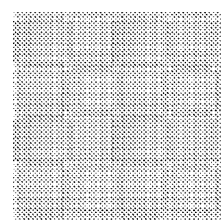
Figure 8E:
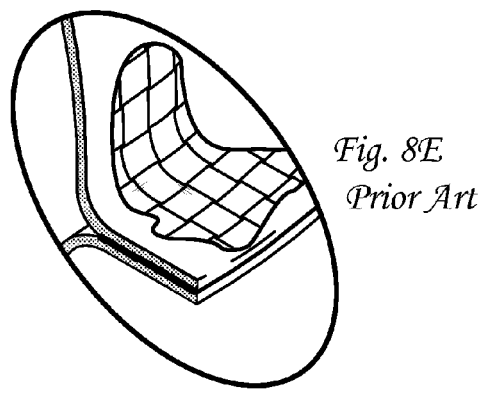
Figure 8D:
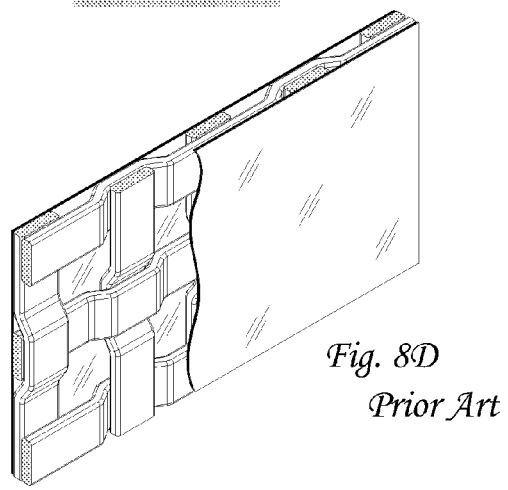
Figure 8F:
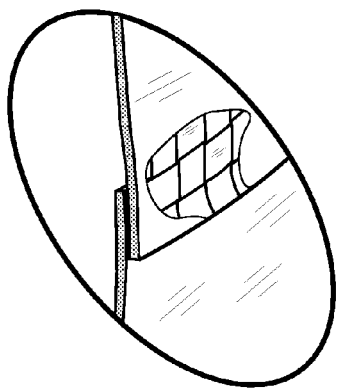
FIG. 8F, 8G illustrate alternative methods of making the seam of FIG. 8E.
Figure 8G:
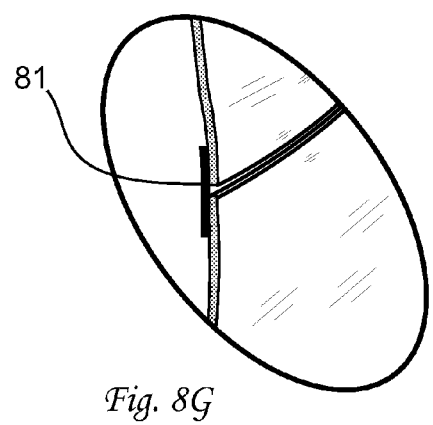

A tetherless driver airbag constructed according to the teaching of this invention is shown generally at 80 in FIG. 8. The film materials that can be used in airbag systems of this invention are disclosed in U.S. Pat. No. 5,653,464 and the woven film material is disclosed in U.S. Pat. No. 7,820,566. FIGS. 8A-8D illustrate various features of the woven film material as illustrated and discussed in the '566 patent. FIG. 8F illustrates an alternate method of constructing a seam which can be useful in some applications where, instead of the lap joint of FIG. 8E, a shear joint is used. In this case, the layers of material to be joined can be heat-sealed or adhesive-sealed together to form the seam. An alternative method is to heat or adhesive seal a tape 81 across the two layers which now can be butted to each other as shown in FIG. 8G. The seams of FIGS. 8F and 8G can, in some cases, provide for a stronger joint depending on the elastic properties of the adhesive used.

Figure 9:
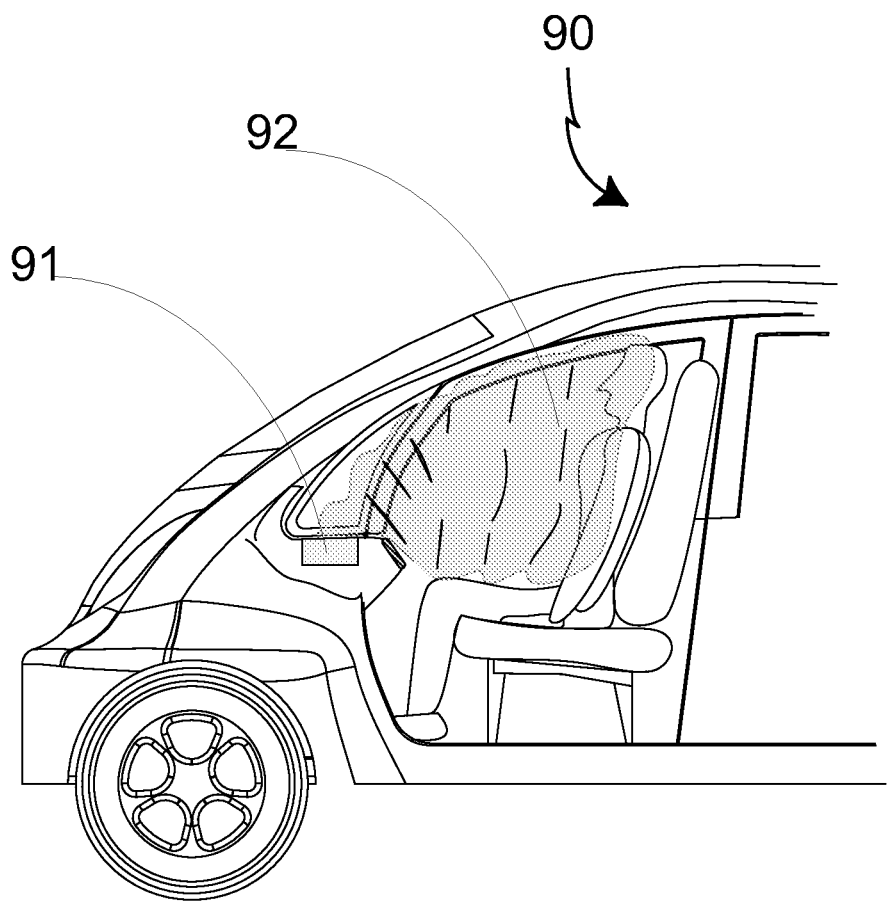
FIG. 9 is an illustration of a passenger airbag constructed according to the similar principles as the driver airbag of FIG. 8.

The passenger airbag constructed in accordance with the teachings of the invention is illustrated at 90 in FIG. 9. An associated airbag module 91 contains the airbag which is shown in the inflated state at 92.

Figure 10:
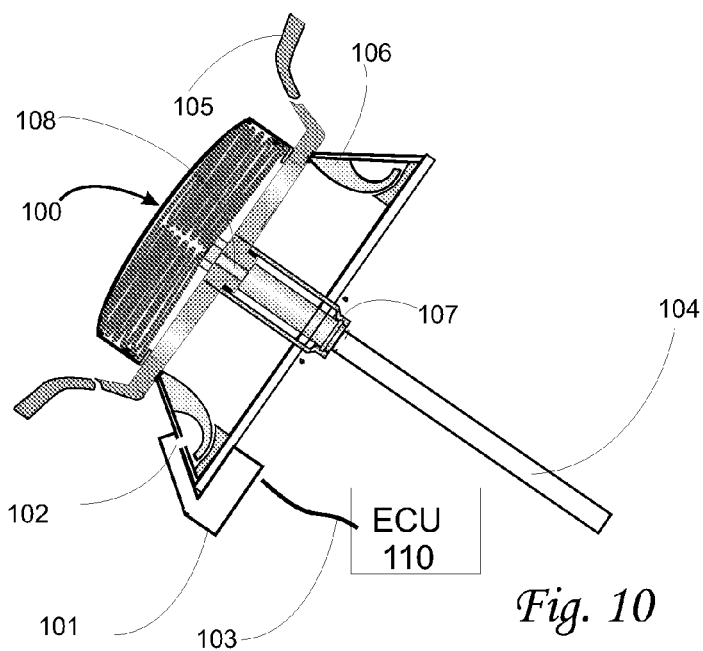
FIG. 10 is an illustration of a driver airbag module and steering column assembly removed from the vehicle.

Looking now at the driver airbag system as shown generally at 100 in FIG. 10. The inflator cartridge of FIG. 7 is shown generally as 101 in FIG. 10 and is mounted to an aspiration system 106 as described above. The aspiration system 106 is mounted to a steering column 104 by an appropriate tube 107 so that it does not rotate with a steering wheel 105. The inflator comprises a combustion cartridge 101 which exhausts into the aspiration system 106 through duct 102. A wire 103 connects the cartridge 101 to the airbag ECU 110. In this manner, an expensive clock spring connection cable used in conventional airbag systems is not required, significantly reducing the cost of the airbag system 101. Airbag ECU 110 may be arranged anywhere in the vehicle, with a preferred placement being in a passenger side airbag module when present.

The steering wheel 105 is mounted to a steering shaft 108 which is rotatably mounted inside the steering column 104.

Figure 11:
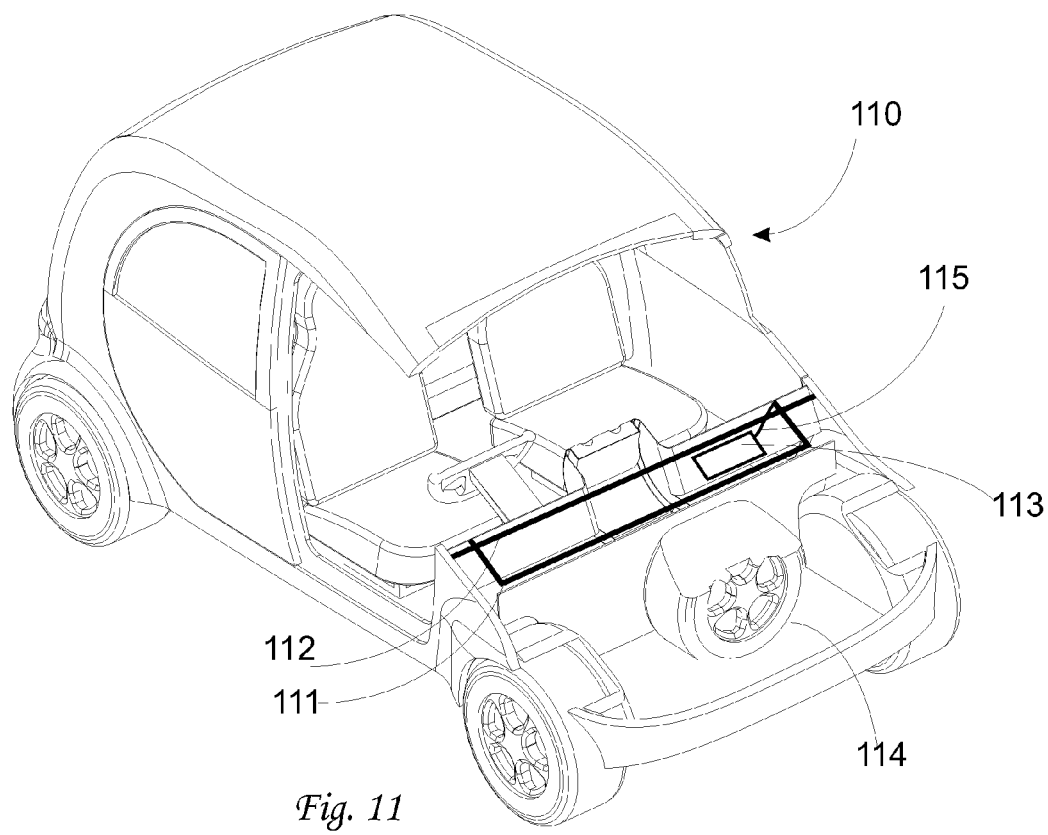
FIG. 11 is an illustration of a vehicle which has been cutaway to show a preferred crush sensor mounting arrangement.

A low cost vehicle, such as the Tata Nano, is illustrated in FIG. 11 with a portion of the front of the vehicle cut away and removed and showing a preferred mounting of a crush sensor. A crush sensor 111 can be positioned on a ledge behind and near the top of a spare tire 114 in the front of the vehicle. The location was chosen so that the crush sensor 111 bends sufficiently to close the contacts, the rod and tube, on a frontal crash into a barrier from any angle between zero and 30 degrees at a crash velocity of no less than 8 MPH and with an all fire of 15 MPH. Positioning and shape of the crush sensor 111 will vary for different vehicle models and in accordance with the requirements of the particular vehicle manufacturer and the country of use. Details of how a crush sensor 111 of this type is designed and mounted are discussed in various commonly owned patents referenced above and in particular U.S. Pat. Nos. 5,441,301, 6,206,129 and 6,328,126.

Crush sensor 111 can be rigidly mounted onto a structural member of the vehicle 112 such that the crush sensor 111 bends and initiates closure before there is substantial deformation of the structural member 112. A wire 115 from the crush sensor 111 leads to the airbag system ECU located within a module 113. This module 113 can be part of the passenger airbag module.

On some occasions, one or more of the discriminating sensors falsely indicate that a crash is in progress and in such cases, deployment of the airbag is not desired. This can happen with a crush sensing crash sensor if the tube becomes bent during maintenance or due to some other action and the rod shorts out against the tube. To guard against this causing airbag deployment, the ECU requires that in addition to the crush sensor closing, an arming sensor (sometimes referred as a safing sensor) must indicate that the vehicle as a whole is decelerating at a level such as above 1 G which can only occur during an accident. A requirement can be set via the ECU software such that both sensors must close within 100 to 500 milliseconds of each other for the airbags to deploy. Thus, if the crush sensor 111 has inadvertently closed and then the arming sensor closes 1 hour later, for example, the airbag will not deploy and a fault indication will occur.

As mentioned below, the arming function can be performed by an IMU if such a device is present. If an IMU or other electronic accelerometer is not present, then a simple pendulum based sensor such as is shown in FIGS. 12A and 12B can be used. Such a device can be attached by solder or other appropriate method to a printed circuit board housed within the airbag ECU by pins 133 and 134. One preferred implementation of the device is shown at 120 in FIG. 12A and comprises a sensing mass 121 in a housing 127. During a crash, sensing mass 121 moves to the right in the drawing causing conductor 126 to move from an insulator or insulating surface 125 toward conducting surface 135 of plug 122. Plug 122 is electrically connected to conductive pin 134. If the acceleration experienced by the sensor is of a sufficient magnitude and duration, typically equivalent to about 1 mph velocity change over 10 to 20 milliseconds, conductor 126 will make contact with conducting surface 135 completing the circuit between pins 133 and 134. Sensing mass 121 can continue moving to the right after contact has been made providing some duration to the contact closure. The ECU will record that contact has been made even for sub-millisecond contact durations and if the crush sensor has also indicated that a crash is in progress then the airbags will deploy. The two crash indicating sensors must close their contacts typically within a time period of typically 20 to 100 milliseconds or the ECU will conclude that there is no crash and that the crush sensor has been inadvertently shorted. In that case, the ECU will suppress the deployment of the airbags and indicate a fault condition.

A slightly different configuration of the arming sensor is shown in FIG. 12B at 130. In this case, the sensing mass 131 is made from a non-conducting material, or has a non-conducting coating, and when at rest, it is in contact with conductive housing 128. Upon sensing sufficient acceleration for a sufficient time period indicative of a crash, contact 129 contacts housing 128 completing the circuit between pins 133 and 134 and sending a crash-in-progress signal to the ECU (not shown) in the manner described above. Another approach is for the arming sensor to be always closed and to open during a crash. In that case, the insulator 125 of FIG. 12A need not be present and the sensing mass 131 of FIG. 12B can be conductive. In both cases, the sensor design is simplified.

In some cases, the vehicle manufacturer may incorporate an occupant sensor to sense the presence of an occupant in the passenger seat of the vehicle and to suppress the airbag if the seat is unoccupied. A more sophisticated version of such a sensor can be used to classify the occupancy of the seat and suppress the airbag if the seat is not occupied by a human above a threshold size or weight. An even more sophisticated version can monitor the health and fatigue state of the driver or passenger. As mentioned above, a simple camera system can perform some of these functions and additionally determine whether the occupant is so close to the airbag that he or she is more likely to be injured by the airbag than by the crash without the airbag. Out-of-position occupant injury is much less of an issue for the systems employing aspirated inflators as described herein. The occupant presence or position sensor would be connected to the control module or ECU that controls airbag deployment and would cause adjustment of the airbag deployment decision by the ECU based on the occupant presence and/or position.

One example of an occupant presence sensor that performs some classification but does not perform position sensing is illustrated in FIG. 13. A vehicle seat is shown generally at 140 and comprises a seat bottom 141 and seatback 142 into which conductive mats 143 and 144 are embedded. Mats 143 and 144 form the plates of a simple capacitor or electric field sensor which can be coupled by the presence of a dielectric material, such as a human occupant, that is placed over the mats 143, 144. A practical implementation could use multiple plates or antennas as would be understood by one skilled in the art and will not be described here. The antennas are controlled by an ECU 145 which can be mounted as part of the vehicle seat or elsewhere. For a more detailed description of this technology, see U.S. provisional patent application Ser. No. 61/452,469 filed Mar. 14, 2011.

It will be appreciated that a large person sitting on the seat will cover a larger part of the seat and have a greater effect on the current to the capacitor plates than for a smaller person. A smaller person setting on the seat will cover a smaller area so the effect will be less. The cost of the mats 143, 144 and a microprocessor to measure the capacity in large quantities can be lower than the price of a camera. The ECU 145 described above preferably uses a MSP430F2001 which also is capable of measuring the current in the occupant sensing electric field sensor. Thus, to add this capability only the cost of the mats and wiring need be considered. This device can also be used to discriminate between a small child and an adult though probably not as accurately as by using a weight sensor. The device can also be used to measure the health and fatigue state of the driver, for example, and can facilitate the use of wireless switches and touch pads as described below and in the '469 application.

A simple weight sensing system can be used by placing strain gages or other force or displacement monitoring sensors on or in conjunction with the bolts that attached the seat to the support and seat adjustment rails. Such a system is described in U.S. Pat. Nos. 7,766,383 and 7,421,321, incorporated herein by reference. Alternately, a simpler system can use a spring and micro-switch in the seat supports which will provide a minimal discrimination based on occupant weight. If the spring switch system is set to allow deployment if at least one of the switches closes, and each is set to close at 50 pounds, then regardless of where the occupant is sitting and if his or her weight exceeds 100 pounds, at least one switch will close. Since the occupant might move forward or back in the vehicle, the system should latch for an appropriate time period. A more sophisticated strain gage weight sensing system is disclosed in U.S. Pat. No. 7,243,945.

Figure 14:
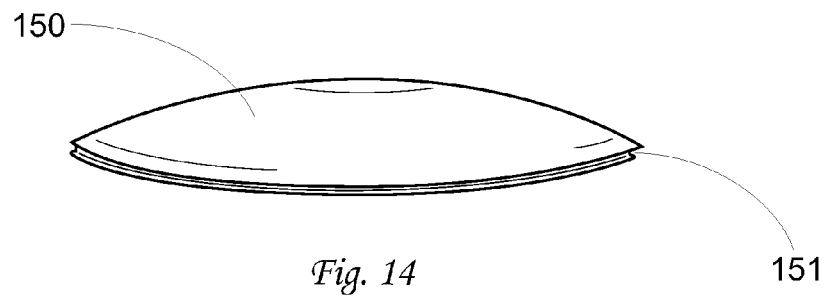
FIG. 14 is an illustration of a pop-off driver airbag module cover and FIG. 14A is a top view of the cover of FIG. 14 with an added horn or touch pad.
Figure 14A:
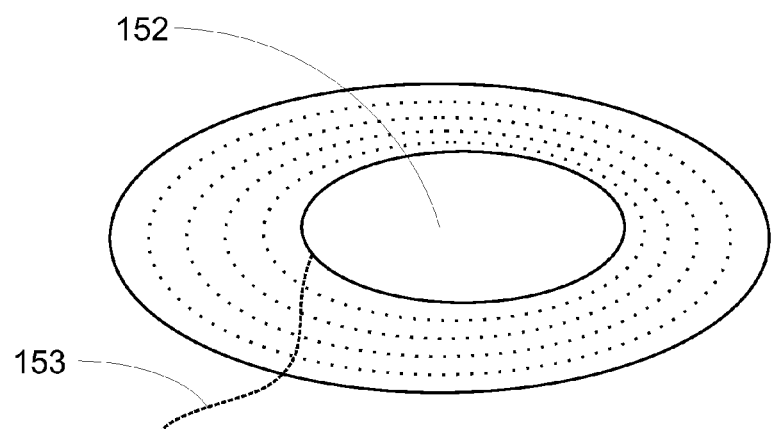

A perspective view of the cover for the driver airbag module is shown at 150 in FIG. 14. Cover 150 can be made from polycarbonate having a thickness of between about 0.010 and about 0.030 inches. Other appropriate materials can be used for the cover such as TPO (Thermoplastic PolyOlefin) with some weight and injury potential penalty. Cover 150 can have a groove 151 which mates with a corresponding lip in the airbag module and is designed such that when pressure is applied to the cover by the airbag, the groove 151 is withdrawn from its mating lip in the airbag module and the cover pops off of the module. The cover 150 can be attached to the module by a strap, not shown, or other method to prevent the cover 150 from being projected at the occupant.

The cover 150 can also comprise a pad 152 in the center, or elsewhere, which can, at a minimum, provide a horn pad. The pad can be connected to appropriate circuitry by a wire 153. If the pad is a conductive surface applied to the cover 150, then contact by the driver can be determined capacitively. As an alternative, a separate pad can be attached to the cover 150 and separated therefrom by its shape or by foam or other method such that a depression of the surface causes two conducting surfaces to connect thereby closing a switch. A more sophisticated alternative is to make the pad 152 into a touch pad where the position of the finger of a driver can be measured and used to control a display, for example, or other device much like the touch pad on a laptop computer. If the perimeter of the pad 152 contains four conductive sections, for example, and the electric field pads are used as in FIG. 13, then the position of the finger can be determined and desired functions implemented. The option space is enormous and no attempt will be made here to cover it. The invention here is primarily to provide a simple switch or touch pad function in conjunction with a thin airbag cover for interacting with or controlling another vehicle component.

Figure 15:
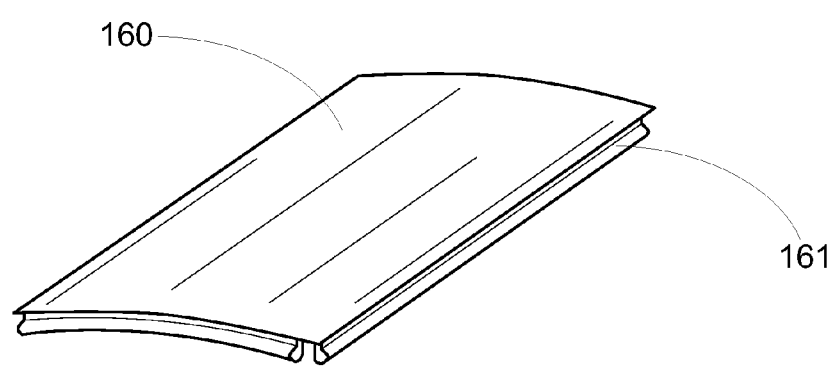
FIG. 15 is an illustration of a pop-off passenger airbag module cover.

A perspective view of the cover for the passenger airbag module is shown at 160 in FIG. 15. As in the driver module, the cover 160 can also be made from polycarbonate having a thickness of between about 0.010 and about 0.030 inches, or other material such as TPO, and has a similar groove 161 for facilitating a pop-off arrangement when the airbag begins to be pressurized. Although not shown, a touch pad device can also be incorporated in conjunction with this cover 160 in order to make efficient use of the area otherwise taken up by the airbag module.

Figure 16A:
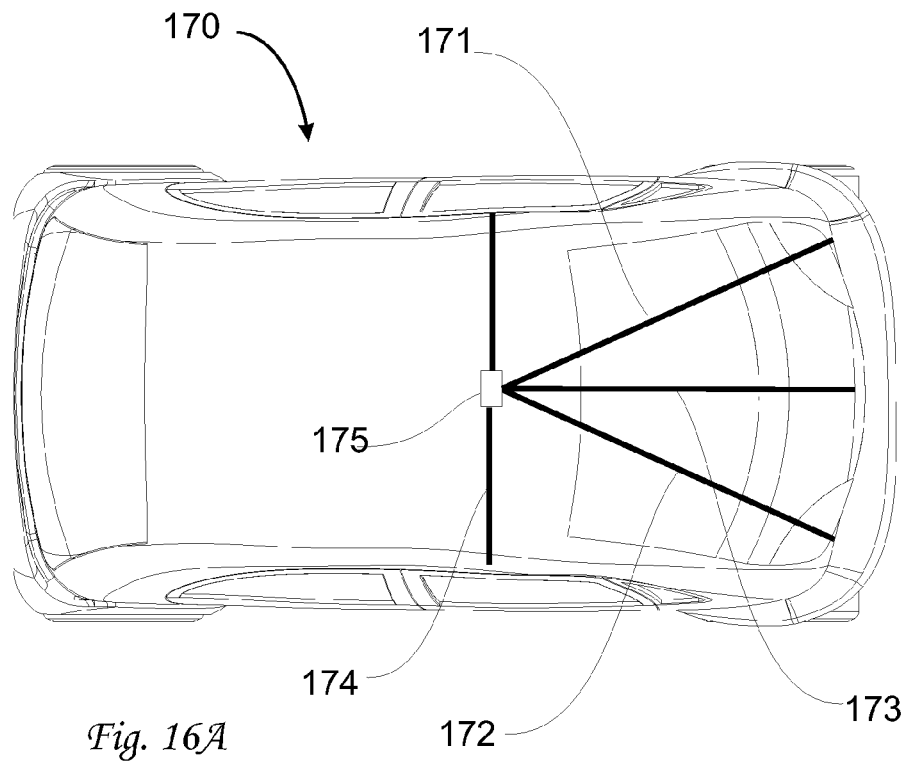
FIGS. 16A and 16B illustrate the single point sensor option using an IMU with FIG. 16A illustrating stiff members connecting the sensors to the vehicle front and side crush zones and 16B illustrating the placement of a MEMS accelerometer or an IMU single point sensor where stiff connecting members are not used for frontal impact sensing.

In another embodiment of a very low cost airbag system, the frontal airbag system can be triggered by a centrally-mounted crash sensor. This crash sensor can be in the form of an inertial measurement unit (IMU) or of a single axis or biaxial MEMS accelerometer either of which is illustrated generally in FIGS. 16A and 16B at 170. The IMU or a single or dual axial accelerometer can be mounted onto a structural member and can be attached to the front of the vehicle by members 171, 172, and 173 and to the sides of the vehicle by members 174. The members 171-174 are rigidly attached to the crush zones of the vehicle and during a crash, they transfer the crash pulse from the crush zone to the IMU 175 so that the IMU 175 experiences the same accelerations that it would experience if it were located at the other ends of the members 171-174. In some cases, these members 171-174 can be part of the vehicle structure as long as they transfer the accelerations to the IMU 175 during the first few milliseconds of the crash and not to the vehicle as a whole so that the IMU 175 can change its velocity relatively independent of the vehicle body or frame. By this technique, a single IMU can be used to sense crashes into both the front and the sides of the vehicle.

Figure 16B:
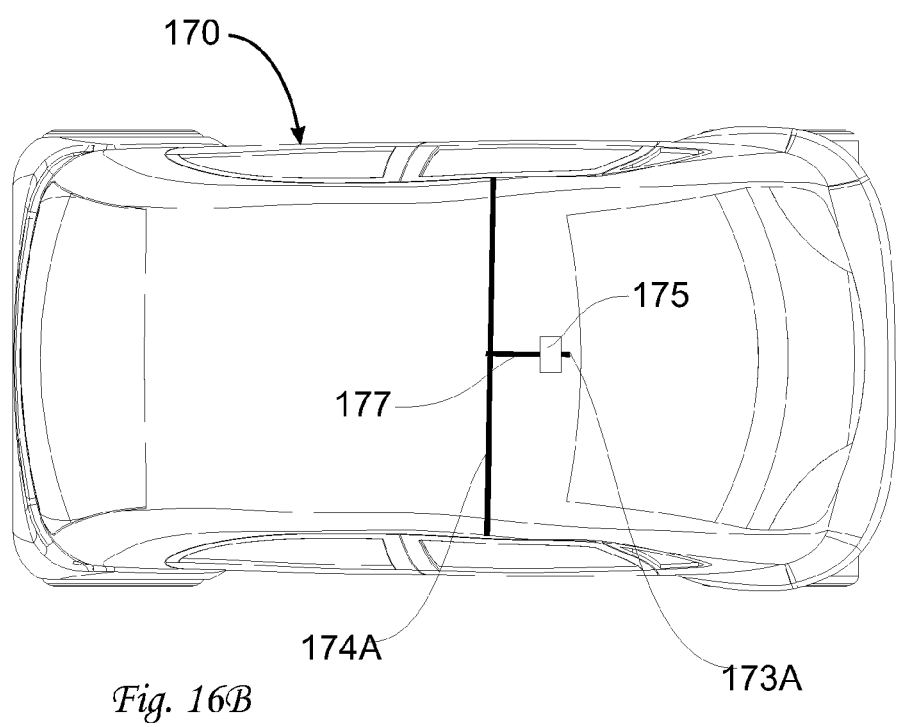

In the implementation illustrated in FIG. 16B, stiff members 174A can act on another stiff member 177 which acts like a lever arm and pivots at attachment point 173A. In this embodiment, the side acceleration that acts on the sensor 175 is reduced by a factor of 10:1, or other appropriate amount, thereby allowing the use of a more sensitive accelerometers in the sensor 175.

When an aspirated inflator is used, as in the preferred implementation of this invention, an out-of-position occupant is unlikely to be injured by the deploying airbag. As soon as the pressure begins to rise due to the airbag interacting with the occupant, the aspiration inflator shuts off and the gas begins to flow out of the venting apparatus which can be the aspirating inflator itself if the aspirating valve is prevented from closing completely. Thus, occupant sensors are in general not required, further reducing the cost of the system. Late sensor deployment when triggered by single point sensors can happen in marginal crashes where the full capacity of the airbag is not required. It can also happen in multiple impacts where the first impact is insufficient to trigger the airbag. Conventional systems on the market today do not take into account either of these cases for the driver and thus the airbag system of this invention is inherently safer than conventional airbag systems now in production. Few production airbag systems today measure the position of the passenger and thus the passenger is at risk when out-of-position. Again, the system of this invention is thus safer than conventional, and much more expensive, passenger airbag systems in production today.

An IMU (inertial measurement unit) is a device that usually contains three accelerometers and three gyroscopes, although various designs can contain differing numbers of such devices, and is available from numerous manufacturers, such as Analog Devices, ST Microelectronics and InvenSense. One novel example is described in U.S. Pat. No. 4,711,125. Such devices are finding increasing use in cell phones and tablet computers, such as the iPhone and iPad. For use for crash and rollover sensing in a vehicle, the range of the accelerometers should be in the 1-200 G range rather than the 0-10 G or less range for use in tablet computers for example. An IMU can be used for non-crush zone crash and rollover sensing if the members 171-174 are not used, in which case, the accelerometer range can be reduced to 1-50 Gs or less. The gyroscopes in both the crush zone and non-crush zone sensing cases can be the same and can be used for rollover sensing. In another implementation, the IMU can be used with the same sensitivity as used in the tablet computers where other discriminatory sensors are used. For example, if a CrushSwitch is used in the crush zone, the IMU can fulfill the functions of sensing rollover and also act as an arming sensor as discussed below. Alternately, the IMU can be rigidly attached to the vehicle structure and a separate tri-axial accelerometer can be attached to members 171-174, in which case, the IMU fulfills the arming and rollover sensing functions.

There are of course many variations to how an IMU can be used in conjunction with acceleration transfer members and other sensors. One other preferred example is to place single axis accelerometers at various locations in the front, side and/or rear crush zones of the vehicle and the IMU in the airbag ECU where it acts as an arming and rollover sensor.

In general, crush zone sensors are used when seatbelt usage cannot be guaranteed. Seatbelt usage in developing countries, such as China and India, is reported to be on the order of 20%. When seatbelts are universally used, then the sensitivity of the crash sensors can be decreased and airbag deployment injuries due to slightly late deployments in soft crashes, for example, are minimized. However, there can still be such airbag-induced injuries to out-of-position occupants. Occupant position sensors can be used to minimize such injuries to out-of-position occupants. The most effective and one of the least expensive of such occupant sensors is a single camera which monitors either the driver or passenger seats or both.

One key advantage of integrating an IMU into a vehicle is that when it is combined with a GPS receiver and a Kalman filter is used, the accuracy of the IMU can be greatly increased. Most low cost IMUs are made using MEMS technology which while low cost suffers from some inherent problems. When the MEMS accelerometers and gyroscopes are micromachined from a single crystal of silicon, for example, there can be residual stresses within the crystal that cause the properties of the device to change with time, temperature, and other environmental factors in an undetermined manner. The devices can be subjected to accelerated ageing, such as heat cycling, for a period and some of the indeterminacies will be reduced. Then, an equation can be derived for each element which relates the device properties to temperature etc. However, a preferred approach when a GPS receiver is present is to periodically analyze the outputs of the IMU and their integrals with the position (location and attitude) of the vehicle as determined from the GPS and then, using a Kalman filter, adjust the constitute equations for each of the devices so that they are internally consistent with each other and agree with the position change as determined from the GPS. By such methods, the accuracy of the IMU can be significantly increased. This technique is generally applicable for the highly sensitive accelerometers, such as those in to less than 1 G to 5 G range. For higher calibration accelerometers, such as used in the crush zone of a vehicle for crash sensing, another technique such as self-testing can be used to improve the accuracy; however, self testing can add cost and complexity to the sensing system. Other sensors can also be employed to improve the IMU accuracy, such as a magnetometer and flux gate compass.

Once an IMU is resident on a vehicle, then other functions, such as electronic stability control, can benefit. Although most IMUs have gyroscopes, an alternate IMU which does not use gyros is discussed in Peng, Y. K. and Golnaraghi, M. F. "A Vector-Based Gyro-Free Inertial Navigation System by Integrating Existing Accelerometer Network", IEEE Position Location and Navigation Symposium, 2004.

The systems described above make use of electrical or electronic crash sensors. The teachings of this invention are also applicable using mechanical sensors and stab primers as disclosed in U.S. Pat. No. 7,481,453.

Figure 17:
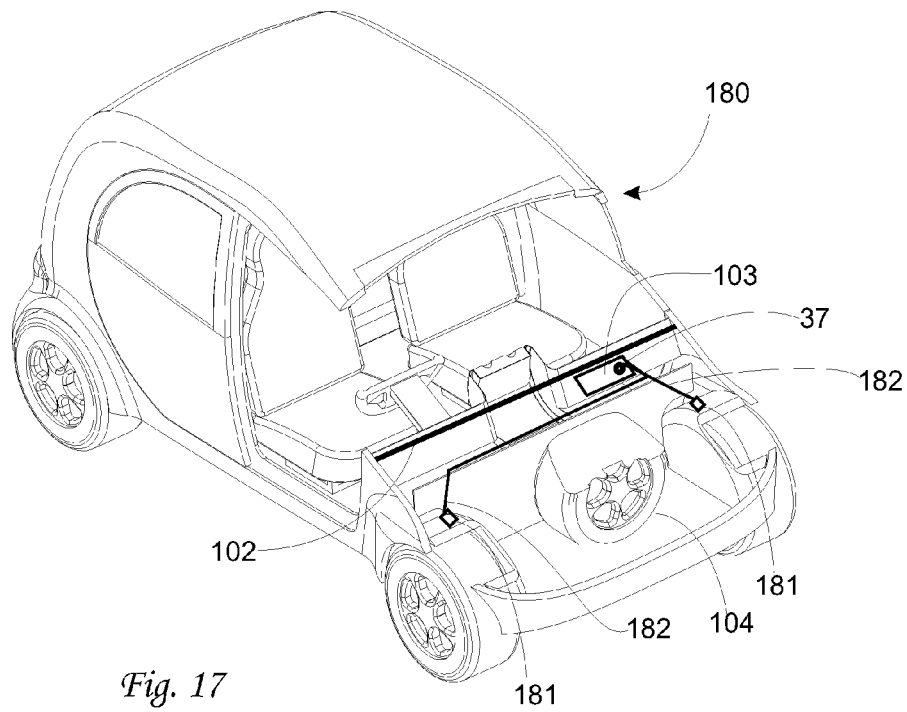
FIG. 17 illustrates an electronic crush zone sensor option.

As discussed above, electronic accelerometers can be used in the crush zone with the low cost airbag system of this invention to sense crashes as is done with conventional airbag systems. This is illustrated generally at 180 in FIG. 17. The measured accelerations from two accelerometer-based crash sensors 181 are converted to digital form, coded based on the accelerometer and fed onto a data bus 182 which is connected to an ECU 37. The ECU 37 processes the data and determines whether the airbags should be deployed. Although two crush zone-mounted accelerometer based sensors are illustrated in FIG. 17, one, three or even more can be used in some applications. This concept of coding signals indicative of a sensed or detected crash can also be used in other embodiments wherein a coded signal is sent from the ECU to gas generator of the driver side and passenger side airbag modules to cause them to initiate generation of inflation medium.

In the case, where the driver and passenger are known to be wearing seatbelts, when it is required by law for example, crush zone sensors may not be required and a single point sensor used. Such a sensor can be made in a manner similar to the arming sensors illustrated in FIG. 12 with a different bias and travel.

Aspirated inflators have an advantage over pure pyrotechnic inflators in that the gas used to inflate the airbag is considerably cooler since 75% or more of the gas that inflates the airbag can come from the passenger compartment. In a similar manner, when aspiration is used with a stored gas inflator, the gas inflating the airbag may not be as cool as the case with a pure stored gas inflator. Even when augmented inflators are used, aspiration results in the temperature of the gas in the airbag being closer to ambient temperature.

Figure 18:
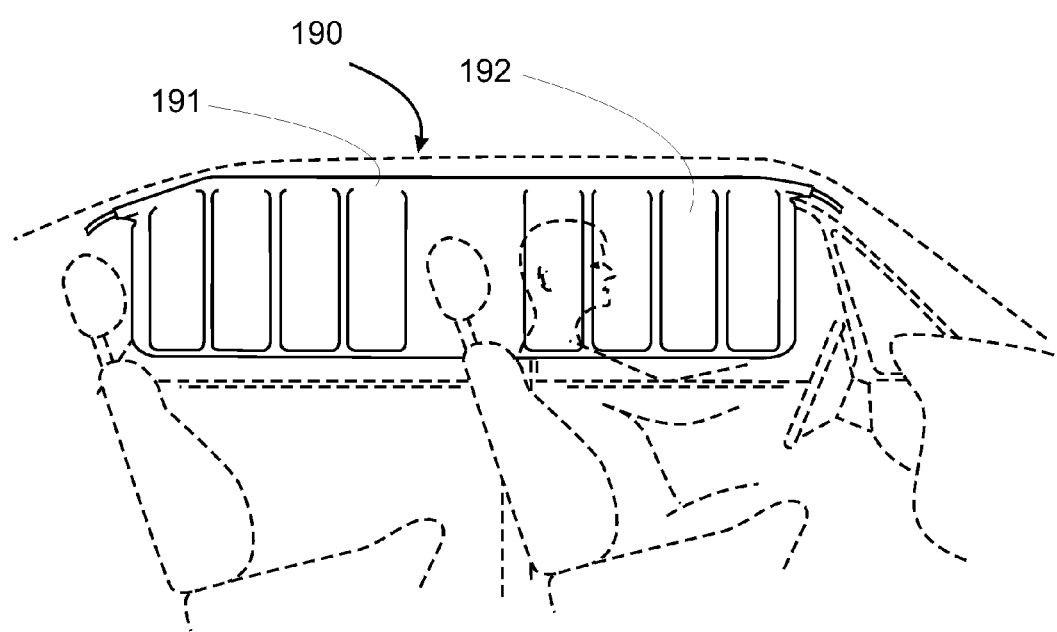
FIG. 18 illustrates use of side curtain airbags.

Finally, the low cost airbag system can be used for side curtain airbags, such as illustrated generally at 190 in FIG. 18, as well as for side airbags which are not shown. Gas from the inflator, which may be aspirated, flows through a passage 191 into chambers 192 in the conventional manner.

With structure described above in any one or more of the various configurations, principle objects of this invention are obtained, including, but not limited to:

1. providing a very low cost airbag system.
2. providing a system with a very low cost crush zone mounted crash sensor which requires a crash causing significant vehicle deformation to trigger, thus substantially eliminating rough road deployments.
3. eliminating electrical connections to the driver airbag mounted on the steering wheel and thus eliminating the costly "clock spring" connection system.
4. utilizing propellants which are readily and inexpensively available in most countries.
5. sufficiently diluting the products of combustion from the gas generators through aspiration creating a breathable environment after deployment when the propellant combustion products contain pollutants, such as carbon dioxide.
6. minimizing wiring cost by placing the energy required to initiate airbag deployment within one or both airbag modules and optionally utilizing a digital signal for driver airbag deployment over the same wire that carries power to charge an airbag capacitor power supply.
7. substantially reducing cost of the airbags by using woven film, eliminating the tethers, eliminating the vent holes by venting through the inflator and minimizing or eliminating sewing through heat, adhesive or vulcanization sealing.
8. simplifying the airbag cover by manufacturing it from a thin high strength plastic, such as polycarbonate through injection molding.
9. initially deploying the airbag through a special charge of very high temperature low density propellant, such as boron potassium nitrate ($BKNO_3$), to aid in starting the aspiration and remove the airbag cover.
10. forming the gas generator and aspiration nozzle housing substantially from plastic.
11. eliminating the need for occupant sensors through friendly non-injuring aspirated inflated airbags.

Other objects and advantages may become apparent from the detailed description of the preferred embodiments above.

Although several preferred embodiments are illustrated and described above, there are possible combinations using other geometries, sensors, materials and different dimensions for the components that perform the same functions. The inventions disclosed herein are not limited to the above embodiments and should be determined by the following claims. There are also numerous additional applications in addition to those described above. Many changes, modifications, variations and other uses and applications of the subject invention will become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the following claims.

The invention claimed is:

1. A vehicle including an airbag system that deploys to protect an occupant of a passenger compartment of the vehicle during a crash involving the vehicle, comprising:

a crash sensor system that detects a crash involving the vehicle;

a steering column;

a steering wheel that rotates relative to said steering column;

a driver side airbag arranged on said steering wheel, said driver side airbag inflating to protect a driver of the vehicle;

an airbag cover that covers said airbag;

an aspiration assembly including a housing situated on an opposite side of said steering wheel than a side to which said driver side airbag inflates, said housing including an outer peripheral side wall having a front edge against a rear surface of said steering wheel such that said housing and said steering wheel define a chamber having an inlet from the passenger compartment only at a rear of said housing, said housing being coupled to said steering column such that said housing does not rotate upon rotation of said steering wheel;

a gas generator that generates inflation medium to inflate said driver side airbag; and a control module coupled to said crash sensor system and said gas generator and initiating generation of inflation medium by said gas generator based on detection of a crash by said crash sensor system, said housing including a passage between said gas generator and said chamber to enable the inflation medium generated by said gas generator to flow into said chamber and an aspiration opening between said chamber and the inlet from the passenger compartment to enable air from the passenger compartment to flow from the passenger compartment into said chamber such that the air from the passenger compartment mixes with the inflation medium in said chamber and then the mixture flows from said chamber through a conduit into said driver side airbag.

2. The vehicle of claim 1, wherein said steering wheel includes at least one aperture communicating with said chamber and said driver side airbag and through which the mixture of air from the passenger compartment and inflation medium flows from said chamber to said driver side airbag.

3. The vehicle of claim 1, wherein said crash sensor system comprises at least one MEMS accelerometer used with a GPS receiver system that corrects errors in said at least one MEMS accelerometer.

4. The vehicle of claim 1, wherein said crash sensor system comprises a crush-detecting sensor arranged along an outer edge of the vehicle to detect crush of the vehicle.

5. The vehicle of claim 1, wherein said chamber is situated inward of said outer peripheral side wall of said housing.

6. The vehicle of claim 1, wherein said driver side airbag is made of plastic film.

7. The vehicle of claim 1, further comprising:
a passenger side airbag module including a passenger side airbag that inflates to protect a passenger of the vehicle;
an additional gas generator that generates inflation medium to inflate said passenger side airbag; and
an aspirated inflator that mixes the inflation medium generated by said additional gas generator with air from the passenger compartment and directs the mixture into said passenger side airbag.

8. The vehicle of claim 7, wherein said control module is further coupled to said additional gas generator and initiates generation of inflation medium by said additional gas generator based on detection of a crash by said crash sensor system, said control module being arranged within said passenger side airbag module and connected to said gas generator and said crash sensor system by wires.

9. The vehicle of claim 7, wherein said passenger side airbag module comprises a capacitor energy storage device that provides energy to said additional gas generator to enable initiation of generation of inflation medium by said additional gas generator.

10. The vehicle of claim 9, further comprising a battery connected by a wire to said capacitor energy storage device to ensure storage of energy by said capacitor energy storage device.

11. The vehicle of claim 7, further comprising an occupant position or presence sensor system that determines information about the presence of the driver or a passenger or the position of the driver or passenger, said control module being coupled to said occupant position or presence sensor system and controlling deployment of said driver side airbag or said passenger side airbag based on the determined information.

12. The vehicle of claim 1, wherein said crash sensor system comprises a first crash sensor and a second arming sensor, said control module being configured to initiate generation of inflation medium by said gas generator only when both said first crash sensor and said second arming sensor are triggered which is thus considered indicative of detection of a crash by said crash sensor system.

13. The vehicle of claim 1, wherein said control module is configured to generate and direct a coded digital signal to said gas generator which upon receipt by said gas generator causes said gas generator to initiate generation of the inflation medium.

14. The vehicle of claim 1, further comprising a capacitor energy storage device that provides energy to said gas generator to enable initiation of generation of inflation medium by said gas generator.

15. The vehicle of claim 1, wherein said crash sensor system consists of a single point crash sensor.

16. The vehicle of claim 1, wherein said crash sensor system comprises an inertial measurement unit (IMU) comprising three accelerometers and three gyroscopes, and a GPS receiver system that improves accuracy measurements provided by said IMU through a Kalman filter.

17. The vehicle of claim 1, wherein said driver side airbag is part of a driver side airbag module and said airbag cover includes a groove that mates with a corresponding lip in said driver side airbag module such that when pressure is applied to said airbag cover upon inflation of said airbag, said groove is withdrawn from its mating lip in said driver side airbag module and said airbag cover detaches from said driver side airbag module, said airbag cover being attachable to said driver side airbag module.

18. The vehicle of claim 1, wherein said gas generator is configured to provide an initial high pressure flow of inflation medium to cause removal of said cover and then a lower pressure flow of the inflation medium.

19. The vehicle of claim 1, further comprising an occupant position sensor system that determines information about presence of at least one occupant, said control module being coupled to said occupant position sensor system and controlling deployment of said driver side airbag based on the determined information, said occupant position sensor system comprising a first conductive mat in a seat portion of a driver seat and a second conductive mat in a back portion of the driver seat, whereby the driver causes adjustment of an electric circuit including said first and second conductive mats which adjustment is convertible into information about the at least one occupant.

20. The vehicle of claim 1, wherein said crash sensor system comprises a centrally-mounted crash sensor mounted onto a first structural member and attached to at least one lateral side of the vehicle by a respective, additional structural member partly situated in a crush zone of the vehicle such that said first and additional structural members transfer a crash pulse from the crush zone to said crash sensor.

21. The vehicle of claim 1, wherein said driver side airbag is made of plastic film.

22. The vehicle of claim 1, wherein said aspiration assembly further comprises a tube that mounts said housing to a steering column, said chamber of said housing being defined between said tube and said outer peripheral side wall of said housing.

23. The vehicle of claim 1, further comprising bearing pads and seals arranged between the front edge of said outer peripheral side wall of said housing and the rear surface of said steering wheel.

* * * * *